United States Patent
Wilenski et al.

(10) Patent No.: US 10,472,472 B2
(45) Date of Patent: Nov. 12, 2019

(54) PLACEMENT OF MODIFIER MATERIAL IN RESIN-RICH POCKETS TO MITIGATE MICROCRACKING IN A COMPOSITE STRUCTURE

(71) Applicant: The Boeing Company, Chicago, IL (US)

(72) Inventors: Mark S. Wilenski, Mercer Island, WA (US); Samuel J. Meure, Fishermans Bend (AU)

(73) Assignee: The Boeing Company, Chicago, IL (US)

( * ) Notice: Subject to any disclaimer, the term of this patent is extended or adjusted under 35 U.S.C. 154(b) by 581 days.

(21) Appl. No.: 14/493,363

(22) Filed: Sep. 23, 2014

(65) Prior Publication Data

US 2016/0083535 A1   Mar. 24, 2016

(51) Int. Cl.
| | | |
|---|---|---|
| C08J 5/04 | (2006.01) | |
| B05D 1/02 | (2006.01) | |
| C08J 5/24 | (2006.01) | |
| B29C 70/88 | (2006.01) | |

(52) U.S. Cl.
CPC ...... *C08J 5/04* (2013.01); *B05D 1/02* (2013.01); *B29C 70/887* (2013.01); *C08J 5/042* (2013.01); *C08J 5/046* (2013.01); *C08J 5/24* (2013.01); *C08J 2300/00* (2013.01)

(58) Field of Classification Search
CPC .......................................................... C08J 5/04
USPC ... 428/297.4, 98, 114, 192, 194, 195.1, 221, 428/323; 442/2, 181, 185, 186, 224, 227; 156/60, 276, 295; 264/239, 241, 257, 264/258
See application file for complete search history.

(56) References Cited

U.S. PATENT DOCUMENTS

| | | | |
|---|---|---|---|
| 3,943,090 | A | 3/1976 | Enever |
| 4,306,040 | A | 12/1981 | Baer |
| 4,629,759 | A | 12/1986 | Rock |
| 4,861,803 | A | 8/1989 | Turner |
| 5,028,478 | A | 7/1991 | Odagiri et al. |
| 5,344,689 | A | 9/1994 | Ide et al. |
| 5,589,523 | A | 12/1996 | Sawaoka |

(Continued)

FOREIGN PATENT DOCUMENTS

| | | |
|---|---|---|
| CN | 101623266 A | 1/2010 |
| EP | 0378854 | 7/1990 |

(Continued)

OTHER PUBLICATIONS

Sunny S. Wicks et al., "Interlaminar Fracture Toughness of a Woven Advanced Composite Reinforced with Aligned Carbon Nanotubes," May 2009.*

(Continued)

*Primary Examiner* — Matthew D Matzek

(57) ABSTRACT

A composite structure may include a resin, a fiber at least partially embedded within the resin, and one or more resin-rich pockets associated with the fiber. The composite structure may include modifiers in the one or more resin-rich pockets. The modifier may have at least one modifier characteristic that is different than a resin characteristic for altering the resin characteristics within the resin-rich pockets and thereby mitigating or preventing crack initiation or crack growth within the resin-rich pockets of the composite structure.

22 Claims, 11 Drawing Sheets

(56) References Cited

U.S. PATENT DOCUMENTS

| | | | |
|---|---|---|---|
| 5,605,745 A | 2/1997 | Recker et al. | |
| 5,618,857 A | 4/1997 | Newberth | |
| 6,503,856 B1 | 1/2003 | Broadway et al. | |
| 6,508,897 B1 | 1/2003 | Yamaguchi | |
| 6,740,185 B2 | 5/2004 | Baldwin | |
| 6,900,254 B2 | 5/2005 | Wills | |
| 7,037,865 B1 | 5/2006 | Kimberly | |
| 7,122,250 B2 | 10/2006 | Kinsho et al. | |
| 7,435,693 B2 | 10/2008 | Tsotsis et al. | |
| 7,645,402 B2 | 1/2010 | Choi et al. | |
| 7,655,295 B2 | 2/2010 | Smith et al. | |
| 7,738,763 B2 | 6/2010 | Ouderkirk | |
| 7,910,636 B2 | 3/2011 | Barker | |
| 8,080,313 B2 | 12/2011 | Bonneau et al. | |
| 8,088,470 B2 | 1/2012 | Dolby | |
| 8,101,106 B2 | 1/2012 | Ellis | |
| 8,283,404 B2 | 10/2012 | Allen | |
| 8,288,453 B2 | 10/2012 | Hsu et al. | |
| 8,519,505 B2 | 8/2013 | Hiroshige et al. | |
| 8,703,630 B2 | 4/2014 | LoFaro et al. | |
| 9,517,608 B2 | 12/2016 | Frulloni | |
| 2002/0119331 A1 | 8/2002 | Jiang | |
| 2003/0174994 A1 | 9/2003 | Garito et al. | |
| 2005/0070666 A1 | 3/2005 | Martin | |
| 2005/0255236 A1 | 11/2005 | Deng | |
| 2006/0057355 A1 | 3/2006 | Suzuki et al. | |
| 2006/0269738 A1 | 11/2006 | Kimberly | |
| 2007/0040299 A1 | 2/2007 | Roth | |
| 2007/0248827 A1* | 10/2007 | Rukavina | B32B 17/1077 428/412 |
| 2007/0282059 A1 | 12/2007 | Keller | |
| 2008/0176987 A1 | 7/2008 | Trevet et al. | |
| 2009/0130376 A1 | 5/2009 | Berkel et al. | |
| 2009/0004460 A1 | 6/2009 | Gruber | |
| 2009/0292035 A1 | 11/2009 | Semmes | |
| 2009/0326137 A1 | 12/2009 | Hsu | |
| 2010/0249277 A1 | 9/2010 | Fang | |
| 2010/0273382 A1 | 10/2010 | Nandi | |
| 2010/0280151 A1 | 11/2010 | Nguyen | |
| 2010/0304119 A1* | 12/2010 | Bonneau | C08G 73/06 428/297.4 |
| 2010/0305274 A1 | 12/2010 | Bonneau | |
| 2011/0021360 A1 | 1/2011 | Al-Ghamdi | |
| 2011/0028308 A1 | 2/2011 | Shah et al. | |
| 2011/0097568 A1 | 4/2011 | Kamae | |
| 2012/0064283 A1 | 3/2012 | Hill et al. | |
| 2013/0029574 A1 | 1/2013 | Van Der Steen | |
| 2013/0167502 A1* | 7/2013 | Wilson | B29C 70/025 57/210 |
| 2013/0221285 A1 | 8/2013 | Song et al. | |
| 2014/0023862 A1* | 1/2014 | Johnson | D06M 11/45 428/375 |
| 2014/0038481 A1 | 2/2014 | Chen | |
| 2014/0076198 A1 | 3/2014 | Kim | |
| 2014/0087178 A1 | 3/2014 | Arai | |
| 2014/0295723 A1 | 10/2014 | Nelson | |
| 2015/0025218 A1 | 1/2015 | Gokturk et al. | |
| 2015/0056882 A1 | 2/2015 | Fukuda et al. | |
| 2015/0252184 A1 | 9/2015 | Arai | |
| 2015/0259493 A1 | 9/2015 | Nederkoorn | |
| 2015/0337183 A1* | 11/2015 | Pratte | C09J 171/00 156/60 |
| 2016/0300810 A1 | 10/2016 | Kanamori | |

FOREIGN PATENT DOCUMENTS

| | | |
|---|---|---|
| EP | 1066224 | 12/2001 |
| EP | 1584451 | 10/2005 |
| EP | 2236549 | 10/2010 |
| EP | 2236549 A1 | 10/2010 |
| EP | 2886590 A1 | 6/2015 |
| JP | H11004081 | 1/1991 |
| JP | H03284988 | 12/1991 |
| JP | H04363215 | 12/1992 |
| JP | H11269393 | 10/1999 |
| JP | 2003166174 | 6/2003 |
| JP | 2008510844 | 4/2008 |
| JP | 2010222422 | 1/2010 |
| JP | 2004162007 | 6/2010 |
| JP | 2010126702 | 6/2010 |
| JP | 2010242083 | 10/2010 |
| JP | 2011157491 | 8/2011 |
| JP | 2012528236 | 11/2012 |
| JP | 2013166854 | 8/2013 |
| WO | WO1999021697 | 5/1999 |
| WO | WO2009119467 | 1/2009 |
| WO | WO2010138546 | 12/2010 |
| WO | WO2014050264 | 4/2014 |
| WO | WO2014073960 | 5/2014 |
| WO | WO2014074767 A1 | 5/2014 |
| WO | WO2015097283 | 7/2015 |

OTHER PUBLICATIONS

European Search Report for EP15186490, dated Jan. 22, 2016.
Sober, D.J., "Kaneka Core-Shell Toughening Systems for Thermosetting Resins," 2007.
Suzuki, M.; Nagai, A.; Suzuki, M., Takahashi, A.: "Relationship between Structure and Mechanical Property for Bismaleimide-Biscyanamide resin," 1992. J. App. Poly. Sci, 45, pp. 177-180.
Fan, H.; Lei, Z.; Pan, J.H.; Zhao, X.S., "Sol-gel synthesis, microstructure and adsorption properties of hollow silica spheres," Materials Letters 65 (2011), 1811-1814.
Hydro, et al., Journal of Polymer Science: Part B: Polymer Physics, 45,1470-1481 (2007).
Extended European Search Report, Application EP15186487, dated Jun. 8, 2016.
European Search Report, Application EP15186487, dated Feb. 4, 2016.
Hackett et al., "The Effect of Nanosilica Concentration on the Enhancement of Epoxy Matrix Resins for Prepreg Composites," Society for the Advancement of Material and Process Engineering, 2010.
Nagavarma et al., "Different Techniques for Preparation of Polymeric Nanoparticles—A Review," Asian Journal of Pharmaceutical and Clinical Research, vol. 5, Suppl 3, 2012.
Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.
EPO, European Search Report, Application EP15186487, dated Nov. 16, 2018.
Zhang et al., "Miscibility, morphology, mechanical, and thermodynamic properties of epoxy resins toughened with functionalized core-shell nanoparticles containing epoxy groups on the surface," Pigment & Resin Technology, vol. 43 Issue: 1, pp. 8-18.
JPO, Office Action for Japanese Patent Application No. 2015-177266, dated Aug. 27, 2019.

* cited by examiner

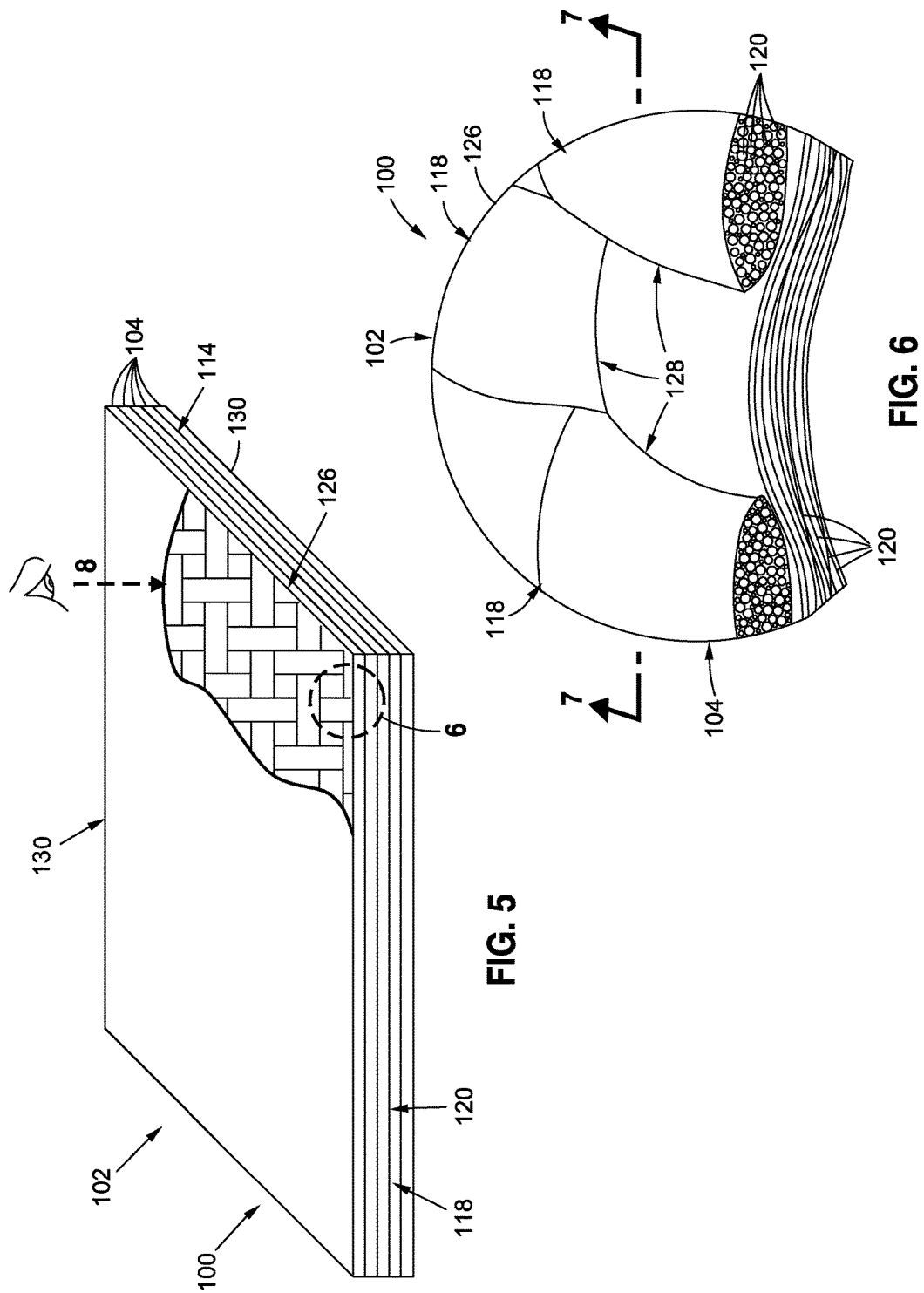

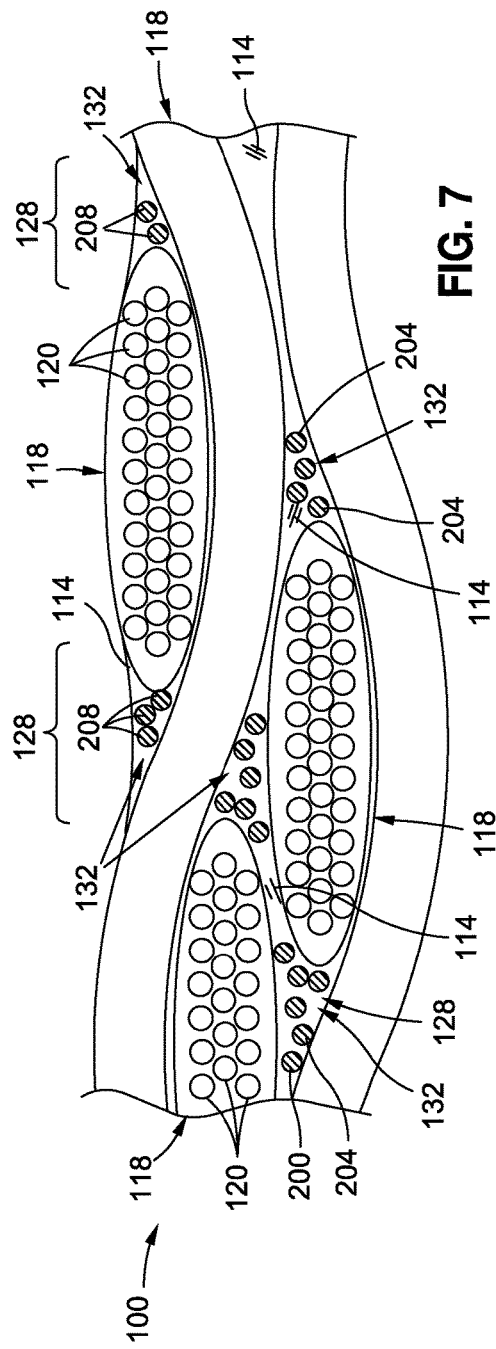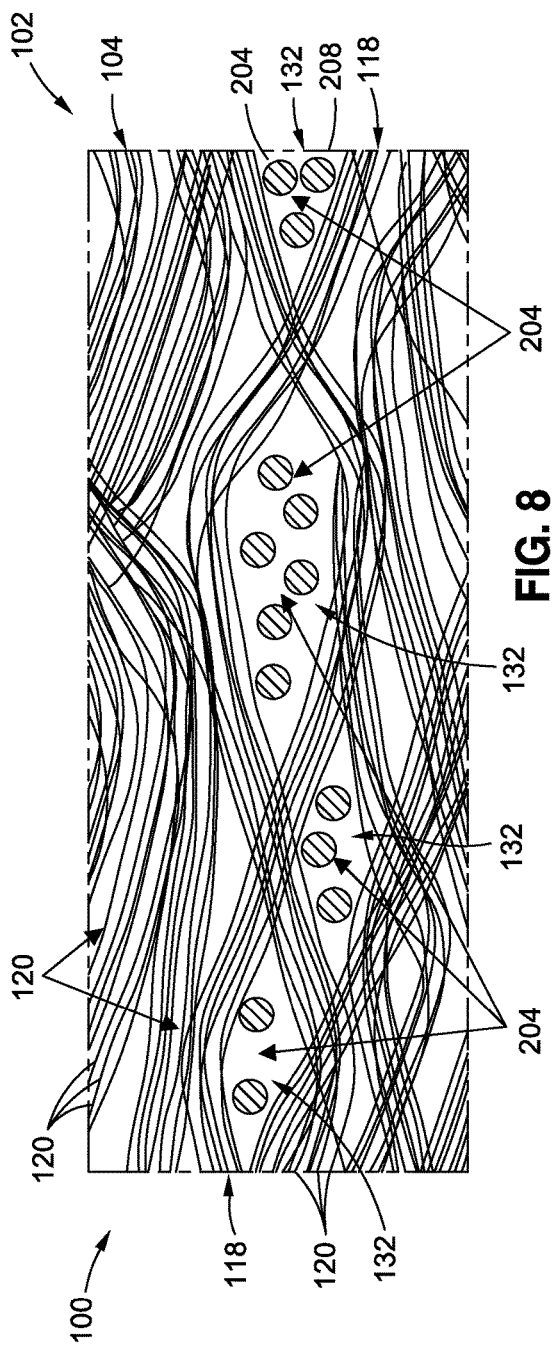

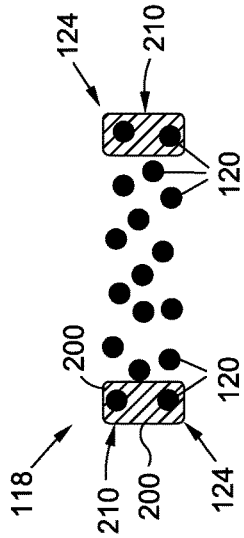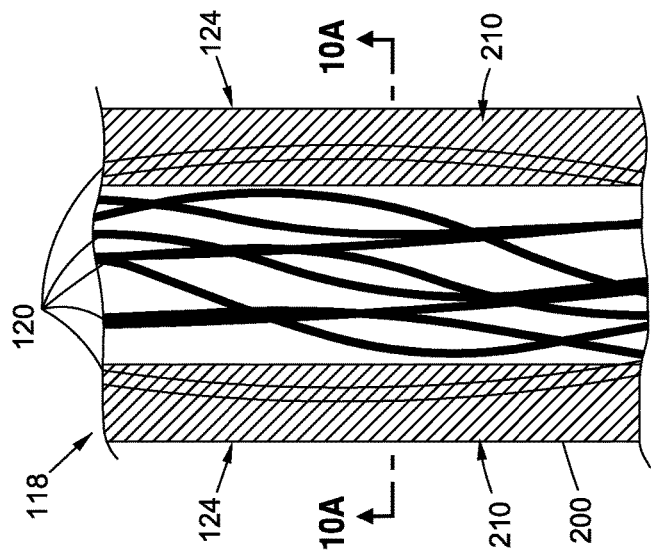
FIG. 9  FIG. 9A
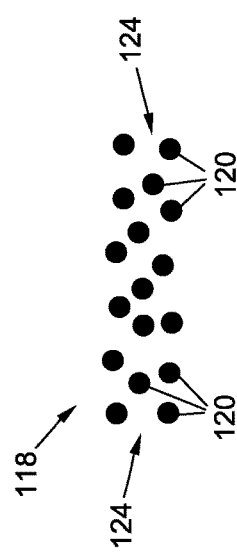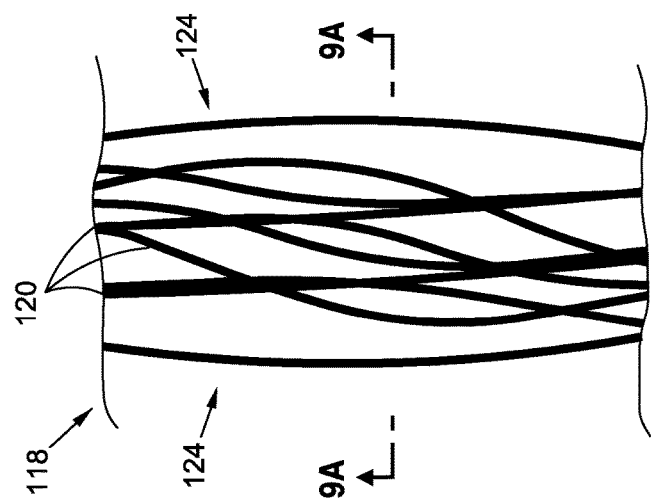
FIG. 10  FIG. 10A

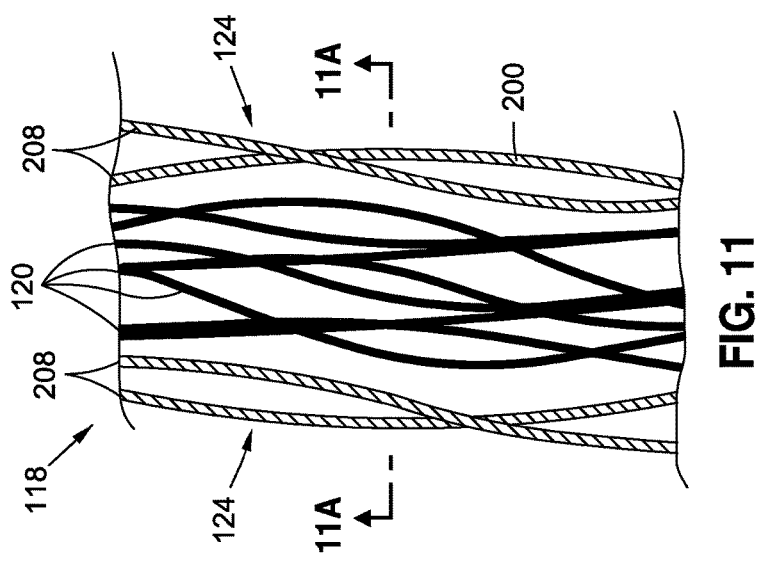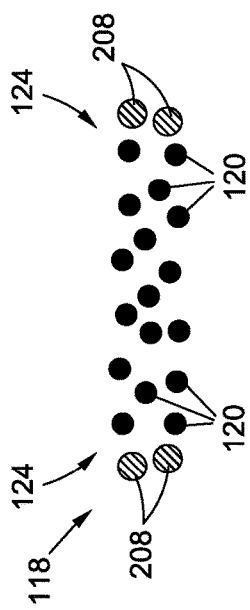

PLACEMENT OF MODIFIER MATERIAL IN RESIN-RICH POCKETS TO MITIGATE MICROCRACKING IN A COMPOSITE STRUCTURE

FIELD

The present disclosure relates generally to composite structures and, more particularly, to incorporating modifier materials into resin-rich pockets of a composite structure during manufacturing to mitigate microcracking of the composite structure.

BACKGROUND

Composite structures typically include structural reinforcing fibers embedded in a resin matrix. Certain areas of a composite layup may include resin-rich pockets which may be described as locations in the composite layup that have a large volume of resin relative to the volume of fibers at the location. Resin-rich pockets may occur between unidirectional fiber tows of a unidirectional ply, at the intersections of fiber tows of woven fabric, at ply steps of a thickness-tapered composite laminate, and at other locations in other types of composite structures.

During the manufacturing of a composite structure, a composite layup may be prepared by applying resin to reinforcing fibers. The temperature of the composite layup may be increased to reduce the viscosity of the resin so that the resin may flow and infuse into the fibers. The composite layup may be held at an elevated temperature for an extended period of time to cure the resin into a solidified or hardened state. After the resin has cured, the composite structure may be cooled to ambient temperature.

In many composite material systems, the resin may have a coefficient of thermal expansion (CTE) that may be different than the CTE of the fibers. For example, epoxy resins may have a CTE that may be an order of magnitude greater than the CTE of carbon fibers. The difference in CTE may result in the resin and fibers contracting by different amounts when the temperature of the composite structure is cooled after curing. The difference in contraction of the resin relative to the fibers may result in thermally-induced stresses in the resin-rich pockets. The thermally-induced stresses may result in undesirable cracking or microcracking in the resin-rich pockets due to the relatively large volume of solidified resin in the resin-rich pockets and the corresponding greater amount of contraction of the resin relative to the fibers in the resin-rich pockets. Microcracking may also occur during the service life of a composite structure due to changes in temperature of the operating environment.

A composite structure may be designed to accommodate a certain amount of microcracking by increasing the structural load-carrying capability of the composite structure. Unfortunately, increasing the load-carrying capability of the composite structure to accommodate microcracking may result in an increase in structural weight which may reduce the performance efficiency of the composite structure. For example, in the case of an aircraft comprised of load-carrying composite structures, an increase in the structural weight of the composite structures may result in a reduction in the range, fuel efficiency, and/or payload capability of the aircraft.

As can be seen, there exists a need in the art for a system and method for preventing or mitigating the occurrence of microcracking in a composite structure during the manufacturing and use of the composite structure.

SUMMARY

The above-noted needs associated with composite structures are specifically addressed by the present disclosure which provides a composite structure that may include a resin and a fiber at least partially embedded within the resin. The composite structure may include one or more resin-rich pockets associated with the fiber. The composite structure may include one or more modifiers located in the resin-rich pockets. The modifier may have at least one modifier characteristic that may be different than a resin characteristic. The modifier characteristic may alter the resin characteristics within the resin-rich pockets and thereby mitigate or prevent crack initiation or crack growth within the resin-rich pockets of the composite structure.

Also disclosed is a method of manufacturing a composite structure. The method may include associating a fiber with a manufacturing tool, placing a modifier in resin-rich pockets associated with the fiber, and applying resin to the fiber. The resin may be cured or hardened to form the composite structure.

Additionally disclosed is a method of resisting microcracking within a composite structure. The method may include applying a load to a composite structure having a fiber, a resin, and a modifier located in resin-rich pockets associated with the fiber. The method may include altering the amount of energy required to form a microcrack in the modifier-containing resin-rich pocket relative to the energy required to form a microcrack in an unmodified resin-rich pocket. In addition, the method may include resisting the load with a load resistance that is different that the load resistance provided by a composite structure lacking the modifier in the resin-rich pockets.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a perspective view of a composite structure including a stack of composite plies formed of woven fabric;

FIG. 6 is an enlarged view of a portion of a composite ply of woven fabric and showing divots and/or intersections associated with the woven fabric and representing resin-rich pockets;

FIG. 7 is a sectional view of a woven fabric showing resin-rich pockets located at the divots and/or intersections of the fiber tows of the woven fabric and illustrating modifiers (shown in angled strokes) placed in the resin rich pockets;

FIG. 8 is a top view of a woven fabric showing resin-rich pockets located between the fiber tows of the woven fabric and illustrating modifiers (in angled strokes) in the resin rich pockets;

FIG. 9 is a top view of a portion of a fiber tow;

FIG. 9A is a cross-sectional view taken along line 9A of FIG. 9 and showing the reinforcing filaments that make up the fiber tow;

FIG. 10 is a top view of a portion of the fiber tow having a modifier coating (shown in angled strokes) applied to one or more of the reinforcing filaments on the outer edges of the fiber tow;

FIG. 10A is a cross-sectional view taken along line 10A of FIG. 10 showing the modifier coating in angled strokes;

FIG. 11 is a top view of portion of a unidirectional tape having modifier filaments applied along the outer edges of the fiber tow;

FIG. 11A is a cross-sectional view taken along line 11A of FIG. 11 illustrating modifiers (shown in angled strokes) applied to the outer edges of the fiber tow;

DETAILED DESCRIPTION

Figure 1:
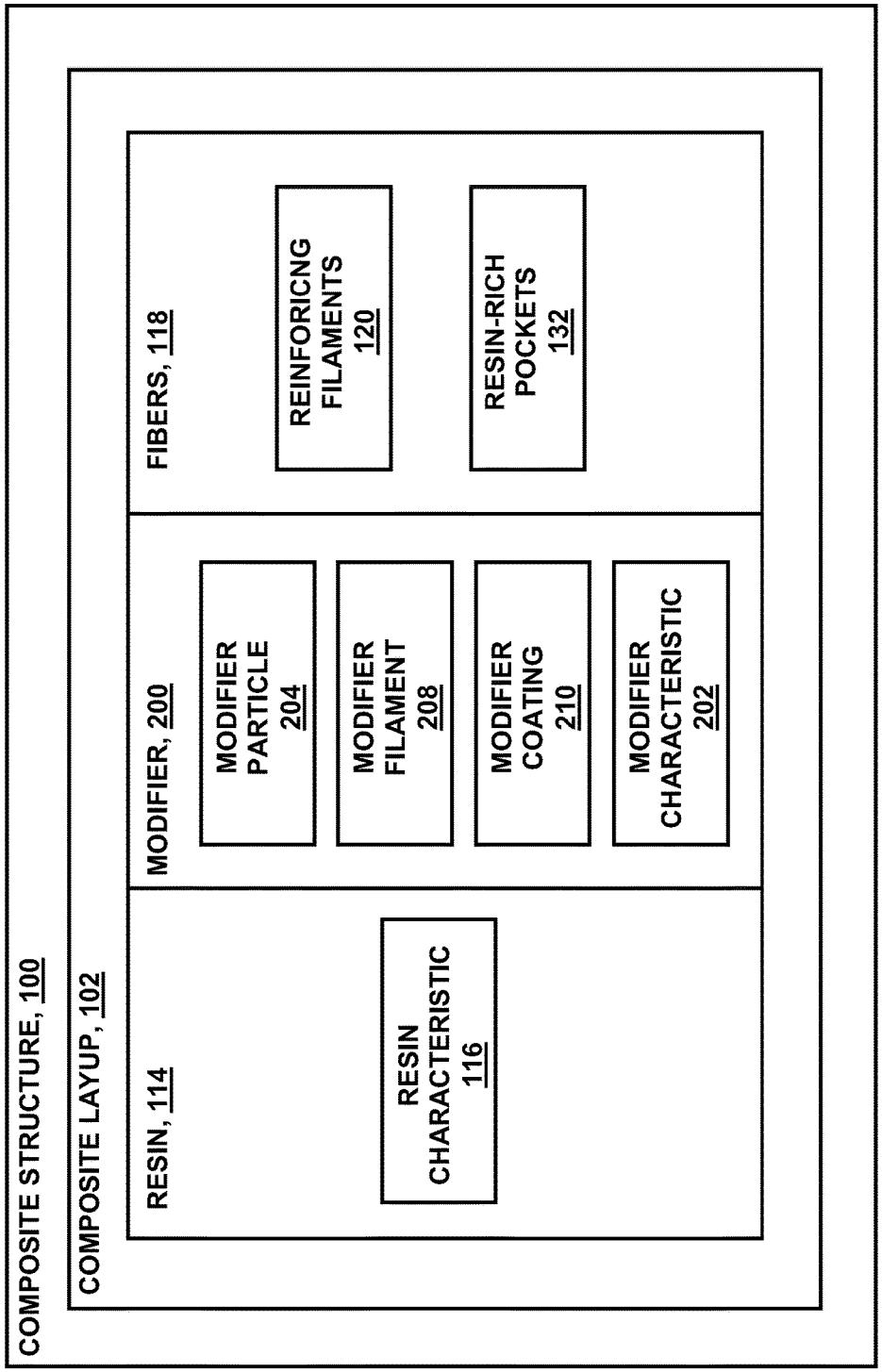
FIG. 1 is a block diagram of a composite structure incorporating modifiers in resin-rich pockets of the composite structure.

Referring now to the drawings wherein the showings are for purposes of illustrating various embodiments of the disclosure, shown in FIG. 1 is a block diagram of a composite structure 100. The composite structure 100 may include a composition of resin 114 and reinforcing fibers 118 at least partially embedded within the resin 114. The composite structure 100 may advantageously include modifiers 200 selectively placed in specific regions of the composite structure 100, and which may be described as resin-rich pockets 132 of the composite structure 100. A resin-rich pocket 132 may be described as a high-resin-content location in the composite structure 100, or a location that has a large volume of resin 114 relative to the volume of fibers 118 and/or a relatively low fiber-volume-fraction at the location.

Resin-rich pockets 132 may occur at any one of a variety of different locations in a composite structure 100. For example, resin-rich pockets 132 may occur in the interstices between reinforcing fibers 118 and/or between reinforcing filaments 120 of a unidirectional ply 108 (e.g., see FIG. 4). Resin-rich pockets 132 may also occur at the divots 128 or gaps associated with intersecting fiber tows 118 of woven or braided fibers 118 such as woven fabric 126 (e.g., see FIGS. 5-8), woven cloth, braided rope, and other woven or braided fiber forms or crimped fiber forms. In addition, resin-rich pockets 132 may occur at ply steps 110 (e.g., see FIGS. 12-12A) of a thickness-tapered composite laminate, and at other locations such as at the corners of a radius filler or noodle (not shown) captured between co-cured or co-bonded composite laminates.

The modifier 200 material may be different than the surrounding resin 114 material such that the modifier 200 provides a modifier characteristic 202 (FIG. 1) that is different than the resin characteristic 116 to allow the modifier 200 material to reduce thermally-induced internal stresses in the resin-rich pockets 132 that may otherwise result in crack initiation or crack growth in the resin-rich pockets 132. A modifier 200 (FIG. 1) may be formed of any one of a variety of thermoplastic and/or thermosetting compositions including, but not limited to, bismaleimides, polyimides, benzoxazines, and phenolics, and/or other chemical compositions which may selected to provide a desired characteristic to the modifier 200 so that the resin characteristics 116 (FIG. 1) in the resin-rich pockets 132 (FIG. 1) may be improved. Modifiers 200 may also be formed of inorganic compounds including, but not limited to, silica. Any one of the modifier 200 configurations disclosed herein may be formed of a material that may be either soluble, partially soluble, or insoluble in the resin 114 (FIG. 1). In some examples, the modifier 200 may have the same chemical composition as the resin 114 and may be pre-cured (e.g., at least partially cured) prior to final curing of the resin 114.

In any one of the examples disclosed herein, modifiers 200 may be added to resin-rich pockets 132 to locally reduce the cure temperature and/or locally reduce the heat of reaction within the resin-rich pocket 132. In some examples, modifiers 200 containing or comprising a catalyst or hardener may be added to resin-rich pockets 132. Such modifiers 200 may be configured to release a catalyst or a hardener during a resin curing process to locally reduce the cure temperature and/or to shorten the time period required for resin cure within the resin-rich pockets 132. In addition, such modifiers 200 may be used to alter the final residual stress in the location containing the modifier 200. A modifier 200 may also have a Young's modulus or modulus of elasticity (e.g., the stiffness of the modifier) that is less than a resin modulus of elasticity. A reduced modulus of the modifier 200 in a resin-rich pocket 132 may have the effect of locally increasing the resin toughness (e.g., the interlaminar fracture toughness) which may reduce the susceptibility of the resin 114 for crack initiation or crack growth in the resin-rich pocket 132. In the present disclosure, a crack or a microcrack may be interchangeably described as a relatively small crack that may form in the resin 114 due to the above-described thermally-induced stresses or due to mechanically-induced stresses. A crack or microcrack may be on the order of several microns or more in width and may affect the structural integrity of the composite structure 100.

A modifier 200 may also have a modifier coefficient of thermal expansion (CTE) (e.g., a modified CTE) that may be lower than the resin CTE and which may reduce thermally induced stresses in resin-rich pockets 132 and thereby mitigate or prevent crack initiation and/or crack growth within resin-rich pockets 132. Other non-limiting examples of modifier characteristics 202 that may mitigate or prevent crack initiation and/or crack growth include a modifier toughness that is higher than a resin toughness, a modifier density that is less than the resin density, and/or a modifier cure shrinkage that is lower than the resin 114 cure shrinkage. A modifier 200 may also have a modifier distortional capability that is higher than the resin 114 distortional capability. An increased free volume or porosity of the modifier 200 may facilitate an increased amount of distortion or strain capability of the modifier 200 relative to the available strain of the base resin 114. Modifiers 200 with increased distortional capability may have the effect of reducing the total strain across a resin-rich pocket 132. A modifier 200 may also possess characteristics 202 that advantageously improve the flammability, smoke, and/or toxicity characteristics of the resin 114 or composite structure 100, or a modifier characteristic 202 may improve the electrical conductivity of a composite structure 100. As may be appreciated, the modifier 200 may possess any one or more of a variety of modifier characteristics 202 that may be different than the resin characteristics 116 and which may improve the manufacturability and/or performance of the composite structure 100.

Advantageously, the targeted placement of modifiers 200 in resin-rich pockets 132 of a composite structure 100 may improve the environmental stability of the composite structure 100 by reducing or inhibiting crack formation and/or crack growth in the resin-rich pockets 132 which may otherwise occur during manufacturing of the composite structure 100 and/or as a result of thermal cycling or mechanical cycling during the service life of the composite structure 100. Selective placement of modifiers 200 in resin-rich pockets 132 may mitigate the occurrence of microcracking while reducing or minimizing undesirable effects that the modifier 200 material may have on the performance of the overall composite structure 100. For example, placing relatively-low-modulus modifier 200 materials in anticipated resin-rich pockets 132 may mitigate microcracking in the resin-rich pockets 132, and may have a minimal effect on the load-carrying performance of the main load-bearing portions in the fiber-rich regions of the composite structure 100.

In addition, by targeted placement of modifiers 200 in resin-rich pockets 132 and by avoiding bulk modification of the resin 114 properties with resin tougheners throughout the composite structure 100, the resin 114 may retain a relatively low viscosity during manufacturing of the composite structure 100 which may facilitate resin flow into and through the reinforcing fibers 118 for faster and more reliable processing. Furthermore, by selectively placing modifiers 200 in resin-rich pockets 132 instead of uniformly disbursing resin tougheners throughout the composite structure 100, the composite structure 100 may retain a relatively high bending modulus and relatively high solvent/moisture resistance. In this regard, the improved resistance to microcracking provided by targeted placement of modifiers 200 in resin-rich pockets 132 may enable a significant reduction in structural weight relative to conventional composite structures.

Modifiers 200 may be provided in any one of a variety of different sizes, shapes, and configurations. For example, modifiers 200 (FIG. 1) may be provided as modifier particulates 204 (FIG. 1), modifier filaments 208 (FIG. 1), and/or modifier coatings 210 (FIG. 1), or in any one of a variety of other shapes and configurations. The selection of modifier 200 shape or configuration may be based upon the type of composite structure 100 and/or shape or configuration of the resin-rich pocket 132 (FIG. 1) into which the modifier 200 may be placed.

Figure 2:
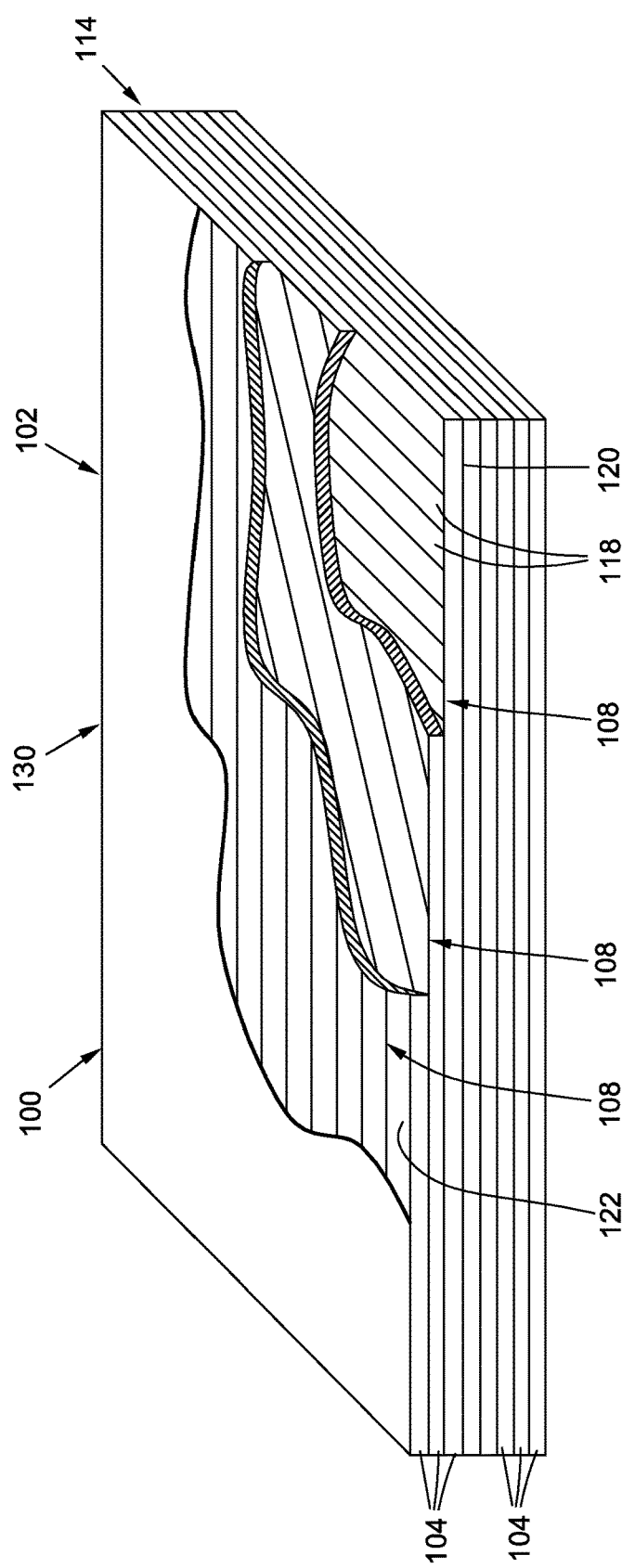
FIG. 2 is a perspective view of a composite structure including a stack of unidirectional plies each formed of a plurality of continuous reinforcing filaments.
Figure 3:
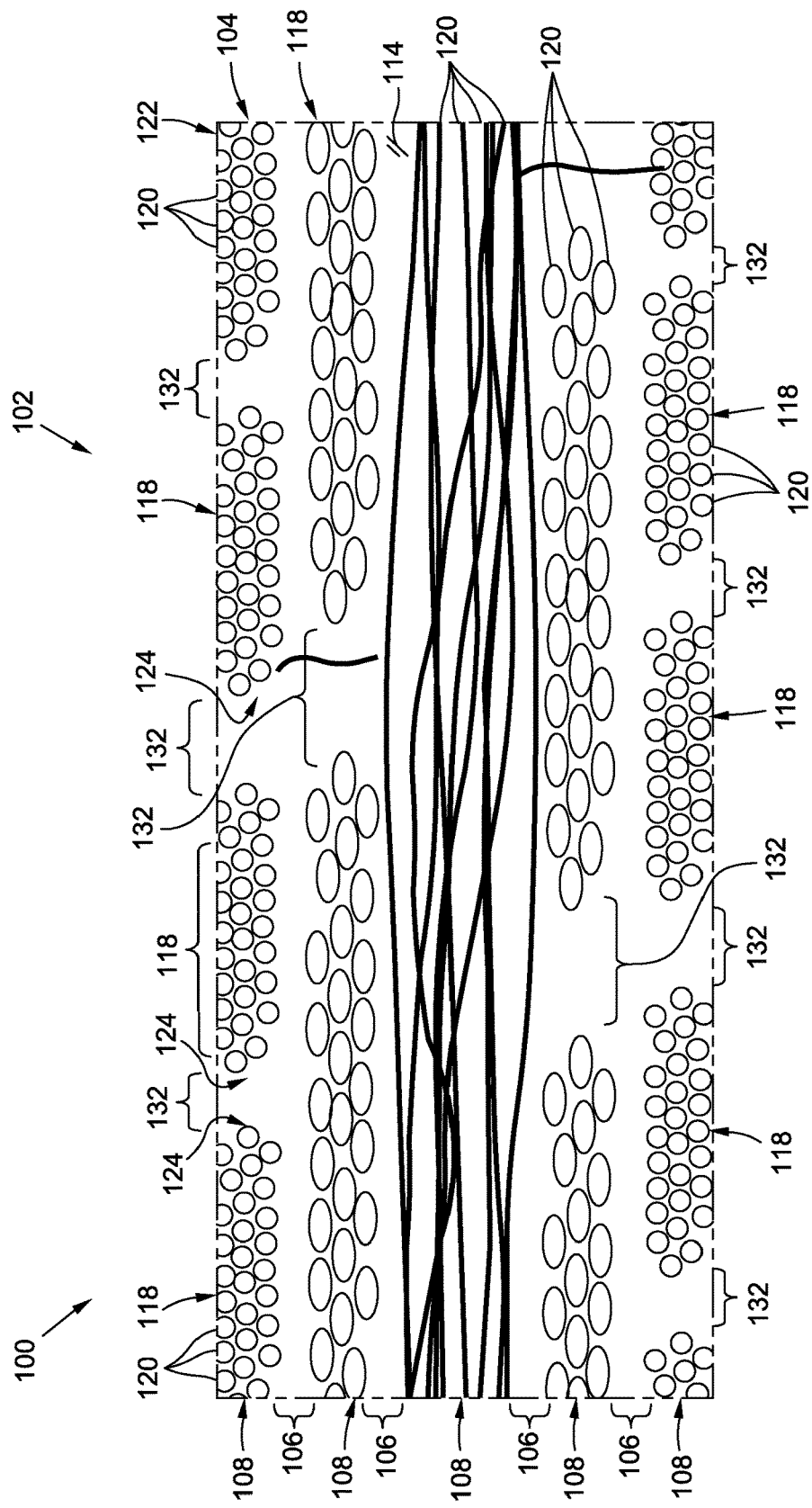
FIG. 3 is an enlarged cross-sectional view of a portion of a composite structure made up of unidirectional plies and illustrating a plurality of resin-rich pockets associated with the unidirectional plies.

FIG. 2 shows an example of a composite structure 100 which may have modifiers 200 (FIG. 3) in the resin-rich pockets 132 (FIG. 3). In the example shown, the composite structure 100 may be formed as a laminated stack of unidirectional plies 108. Each one of the unidirectional plies 108 may include a plurality of parallel fiber tows 118 laid side-by-side. In the example shown, the fibers 118 in one composite ply 104 may be oriented non-parallel to the fibers 118 in an adjacent composite ply 104 (e.g., above or below) in the stack. However, one or more of the composite plies 104 may include fibers 118 that are oriented parallel to the fibers 118 in an adjacent composite ply 104. In one example, the fibers 118 may be carbon or graphite fibers. However, in other composite structure 100 examples disclosed herein, the fibers 118 may be formed of non-carbon material. For example, the fibers 118 may be formed of boron, glass, ceramic, metallic material, and/or any other type of fiber material.

In FIG. 2, the fibers 118 in each one of the unidirectional plies 108 may be provided as parallel fibers of unidirectional tape 122 or unidirectional sheet. Each one of the composite plies 104 may include a plurality of continuous reinforcing filaments 120 or continuous fiber tows 118. A single fiber 118 may include several thousand reinforcing filaments 120 (e.g., 1000 to 100,000 or more reinforcing filaments) bundled together. In some examples, a reinforcing filament may have a filament cross-sectional width or diameter of 5-30 microns. For example, a carbon reinforcing filament may have a filament cross-sectional width of approximately 5-7 microns. Glass reinforcing filaments may have a filament cross-sectional width of 10-25 microns. In the present disclosure, a fiber or fiber tow 118 may be interchangeably described as a bundle of untwisted, continuous reinforcing filaments 120. Reinforcing fibers 118 in the present disclosure may also encompass chopped fibers as may be incorporated into a fiber mat. Reinforcing fibers 118 of the present disclosure may also be provided in other fiber configurations.

A composite structure 100 (FIG. 5) may be formed of composite plies 104 (FIG. 5) that may be pre-impregnated with resin (e.g., prepreg composite plies). Alternatively, a composite structure 100 may be formed as a dry fiber preform 130. For example, a composite structure 100 may be formed by laying up a stack of dry fiber sheets into which resin may be infused in a wet layup process. In any one of the examples disclosed herein, the resin 114 (FIG. 5) and/or the reinforcing fibers 118 (FIG. 5) may be formed from thermoplastic material or thermosetting material. Thermoplastic material may include at least one of the following: acrylics, fluorocarbons, polyamides, polyethylenes, polyesters, polypropylenes, polycarbonates, polyurethanes, polyetheretherketone, polyetherketoneketone, and polyetherimides. Thermoset material may include one of the following: polyurethanes, phenolics, polyimides, bismaleimides, polyesters, epoxies, and silsesquioxanes. In addition, in any one of the examples disclosed herein, the reinforcing fibers 118 may be formed from materials such as carbons, silicon carbide, and boron. The reinforcing fibers 118 may also be formed from glass such as E-glass (alumino-borosilicate glass), S-glass (alumino silicate glass), pure silica, borosilicate glass, optical glass, and other glass compositions.

FIG. 3 is an enlarged cross-sectional view of a portion of a composite structure 100 made up of unidirectional plies 108 and illustrating a plurality of resin-rich pockets 132 associated with the unidirectional plies 108. The resin-rich pockets 132 may be described as the areas between adjacent fiber tows 118 or unidirectional tape of a unidirectional ply 108. However, resin-rich pockets 132 in a composite laminate may also include resin-rich interlaminar regions located at the interface between adjacent composite plies, or in other locations of a composite laminate.

Figure 4:
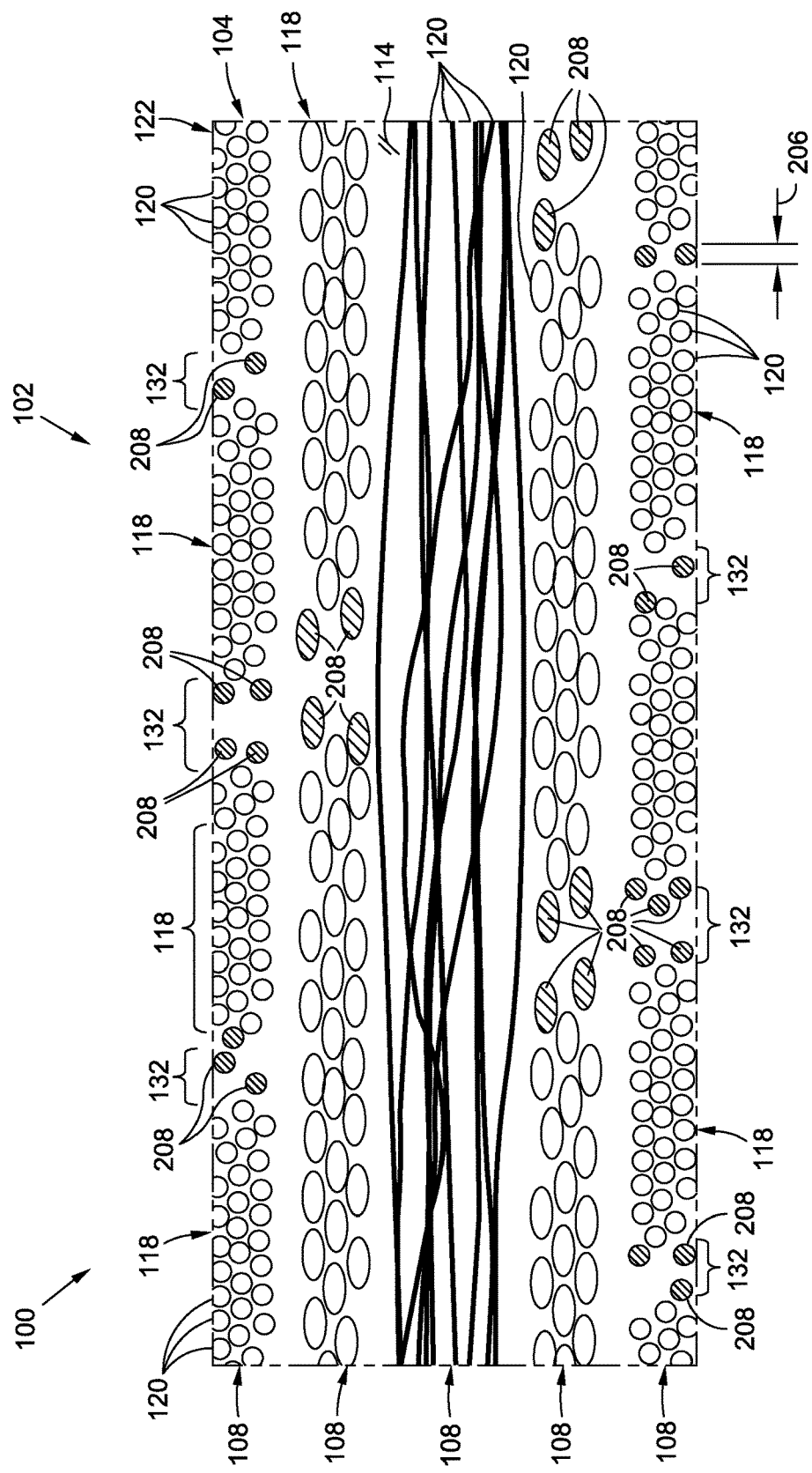
FIG. 4 is an enlarged cross-sectional view of a portion of a composite structure with modifier filaments (shown in angled strokes) included in the resin-rich pockets.

FIG. 4 shows the composite structure 100 of FIG. 3 with modifier filaments 208 placed within the resin-rich pockets 132 to mitigate or prevent crack initiation and/or crack growth in the resin-rich pockets 132. In the example shown, the modifier filaments 208 may be positioned along the outer edges 124 (FIG. 3) of the fiber tow 118 or tape. In this regard, the outer edges 124 of an adjacent pair of fiber tows 118 or tape in a unidirectional ply 108 may define a resin-rich pocket 132. In some embodiments, the modifier filaments 208 may be generally continuous filaments and may be oriented generally parallel to the reinforcing filaments 120 of a fiber tow 118 or tape. In other embodiments, the modifier filaments 208 may be chopped modifier filaments or chopped (e.g., short or non-continuous) filament strands (not shown).

In FIG. 4, the modifier filaments 208 of the uppermost and lowermost composite ply 104 may be oriented along a direction normal to the plane of the paper and parallel to the reinforcing filaments 120 of such plies. Although not shown, the modifier filaments 208 of the middle composite ply 104 in FIG. 3 may be oriented along a direction parallel to the plane of the paper and parallel to the reinforcing filaments 120 of the middle ply. The modifier filaments 208 of the composite plies 104 located between the middle composite ply 104 and the respective uppermost and lowermost composite ply 104 may be oriented along a direction non-parallel and non-perpendicular to the plane of the paper and parallel to the reinforcing filaments 120 of such plies.

The modifier filaments 208 may be applied during the manufacture of fiber tows 118, unidirectional tapes, or sheet, or woven cloth, and/or the modifier filaments 208 (FIG. 4) may be applied during the layup of a composite structure 100 (FIG. 4). For example, modifier filaments 208 may be applied to the outer edges 124 (FIG. 3) of the fiber tows 118 (FIG. 4) or tape during the manufacture of the fiber tows 118, tape, or unidirectional sheet prior to layup. In another example, modifier filaments 208 may be directly applied to a fiber preform 130 (FIG. 5) during layup, as described in greater detail below. In some examples, one or more modifier filaments 208 may also be applied to at the interface between adjacent composite plies 104 (FIG. 4) of a ply stack.

In FIG. 4, the modifier filaments 208 may have a cross-sectional width 206 that may be generally similar to the cross sectional with of the reinforcing filaments 120. In some examples, the modifier filaments 208 may have a cross-sectional width 206 (e.g., a diameter) of up to 10 microns or more. However, the modifier filaments 208 or any other modifier 200 (FIG. 1) configuration (e.g., modifier particulates 204) may have a cross-sectional width 206 that may be less than the cross-sectional width of the reinforcing filaments 120. For example, the modifier filaments 208 and/or modifier 200 particles may have a cross-sectional width 206 of less than approximately 20 microns. In other examples, the modifier filaments 208 and/or modifier 200 particles may have a cross-sectional width 206 of less than approximately 200 nanometers.

The modifier filaments 208 may be formed of a different material than the resin 114 and/or the reinforcing filaments 120 and may have at least one modifier characteristic 202 (FIG. 1) that is different than the resin 114 (FIG. 4), as indicated above. In some examples, the modifier filaments 208 (FIG. 4) may be formed of non-carbon material and the reinforcing filaments 120 (FIG. 4) may be formed of carbon material. Any one of the forms of modifier 200 (FIG. 1) disclosed herein (e.g., modifier particulates 204, modifier coatings 210, etc.) may have a modulus of elasticity that is lower than the resin modulus of elasticity. The reduced modulus of the modifiers 200 may have the effect of locally increasing the toughness of the resin 114 which may reduce the susceptibility of the resin-rich pockets 132 to cracking. The modifiers 200 may also have a modifier CTE that may be lower than the resin CTE and/or a modifier cure shrinkage that may be less than the resin 114 shrinkage.

A relatively low modifier CTE and/or a relatively low modifier cure shrinkage may have the effect of reducing thermally induced stresses in the resin-rich pockets 132 (FIG. 4) and thereby mitigate or prevent crack initiation and/or crack growth during cool down from an elevated curing temperature and/or during thermal cycling or mechanical cycling during use of the composite structure 100 (FIG. 4). The modifiers 200 (FIG. 1) may provide a strain release mechanism that does not involve the formation of cracks within the resin 114 (FIG. 4). Furthermore, the relatively-low-CTE modifiers may occupy a portion of the volume of the base resin 114 within the resin-rich pockets 132 which may reduce the total strain across the resin-rich pocket 132 due to the reduction in the volume of relatively-high-CTE base resin 114 in the resin-rich pocket 132.

In some examples, modifiers filaments 208 (FIG. 4) may be provided as thermoplastic filaments with a modulus and/or a CTE that is different (e.g., lower) than the resin modulus and/or resin CTE. In other examples, the modifier filaments 208 may be provided as carbon filaments coated with a toughened resin or binder. In still other examples, the modifier filaments 208 may be provided as soluble filaments that are soluble in the resin and 114 (FIG. 4) and are configured to increase the toughness of the resin 114 in the resin-rich pockets 132. The modifier filaments 208 may also be provided as chopped filament strands (not shown) which may be described as non-continuous or discontinuous filaments relative to the continuous-length reinforcing filaments 120. The filament strands may be distributed within the resin-rich pockets 132. In some examples, the filament strands may be encapsulated in a thermoset prepolymer and tacked to the outer edges 124 of the fibers 118 (FIG. 4). The fibers 118 to which the chopped filament strands may be applied may include continuous fibers 118 or unidirectional cloth. However, chopped filament strands may also be applied to or included with the discontinuous fibers and/or chopped fibers of a chopped fiber mat (not shown).

FIG. 5 shows a composite structure 100 arranged as a stack of woven fabric 126 plies. Each one of the woven fabric 126 plies may be formed by weaving fiber tows 118 or roving. The plies may be pre-impregnated with resin 114 (e.g., prepreg) which may be provided in a partially-cured state. After layup, the resin 114 of the prepreg woven fabric 126 plies may be heated to reduce the viscosity of the resin 114 to allow the resin 114 to flow and infuse uniformly throughout the woven fabric 126 plies and intermingle with the resin 114 of adjacent woven fabric 126 plies. The layup may be consolidated and the resin 114 may be cured to form the composite structure 100. Alternatively, the woven fabric 126 plies may be provided as dry fiber preforms 130 which may be infused with resin 114 in a wet layup process after which the resin 114 may be cured to form a composite structure 100.

FIG. 6-7 shows a portion of a composite structure 100 formed of bi-directional woven fabric 126 and illustrating divots 128 and/or gaps at the intersections of the fibers 118 of the woven fabric 126. The divots 128 and/or gaps may represent resin-rich pockets 132. Modifiers 200 may be incorporated into the resin-rich pockets 132 associated with the woven fabric 126. For example, a plurality of modifier particulates 204 and/or chopped filament strands may be specifically placed within the resin-rich pockets 132 at the location of the divots 128 and gaps of a woven fabric 126 to mitigate or prevent crack initiation and/or crack growth within the resin-rich pockets 132.

FIG. 8 is a top view of a woven fabric 126 showing resin-rich pockets 132 located between overlapping (e.g., woven) fiber tows 118 that create resin-rich pockets 132 and which may be susceptible to crack formation during thermal cycling or mechanical cycling. The woven fabric 126 may advantageously incorporate modifier particulates 204 within the resin-rich pockets 132 which may inhibit or prevent crack initiation and/or crack growth by reducing the difference between the resin CTE and the fiber CTE. In this regard, in any of the embodiments disclosed herein, the modifier CTE may be lower than the base resin CTE such that the resin CTE within the area of the resin-rich pocket 132 is reduced relative to the CTE of resin that is devoid of modifiers 200 (FIG. 7).

In one example, the modifiers 200 may be soluble within the resin 114 such that the resin CTE in the resin-rich pocket 132 is reduced relative to the resin 114 that is devoid of modifiers 200 (FIG. 7). In another example, modifiers 200 may be insoluble within the resin 114. However, because the modifier CTE is lower than the resin CTE, the presence of the modifier 200 may reduce the global CTE of the resin 114 within the resin-rich pocket 132 (FIGS. 7-8). In some examples, the modifier particulates 204 may be generally rounded or spherical to avoid increasing the viscosity of the resin 114 at high load levels of modifier particulates 204 in the resin 114 (FIGS. 7-8). However, the modifier particulates 204 may be provided in shapes other than a spherical shape. For example, modifier particulates 204 (FIGS. 7-8) may be provided in faceted three-dimensional shapes such as a cube or other shapes that have a minimal effect of the viscosity of the resin 114.

The target placement of modifier particulates 204 into the resin-rich pockets 132 of woven fabric 126 (FIGS. 6-8) may be provided by directly spraying modifier particulates 204 onto the woven fabric 126 at the location of the divots 128 and/or gaps or at other resin-rich pockets 132 (FIGS. 6-8). For example, modifier particulates 204 (FIGS. 6-8) may be provided in a solution which may be sprayed onto specific areas at the resin-rich pockets 132 of a fiber preform 130 (FIG. 5). The modifier particulates 204 may also be placed in the resin-rich pockets 132 during prepregging operations and/or during layup of the woven fabric 126. The modifier particulates 204 may also be placed in the resin-rich pockets 132 by manual placement and/or by using a robotic device (not shown). In some examples, after placement of the modifiers 200 (FIG. 7), vibration or movement may be applied to a fiber preform 130 during layup which may result in natural agglomeration of the modifier particulates 204 within the gaps and divots 128 which may form the resin-rich pockets 132 of the woven fabric 126 after consolidation.

In another example, a modifier coating 210 may be applied to the reinforcing filaments 120 of a fiber tow 118 that may be later woven into a woven fabric 126. For example, a modifier coating 210 may be applied to the reinforcing filaments 120 located on the opposing outer edges 124 (FIGS. 10-10A) of fiber tows 118 or roving. For example, a modifier coating 210 may be applied to the reinforcing filaments 120 prior to or during layup of the woven fabric 126. In one embodiment, a modifier coating 210 (FIGS. 10-10A) may be applied to opposing outer edges 124 of the fiber tows 118 during manufacture of the fiber tows 118 (FIGS. 11-11A). Modifier filaments 208 may be placed along the outer edges 124 (FIGS. 11-11A) of fiber tows 118 or roving prior to weaving the fiber tows 118 or roving into a woven fabric 126. The above-described examples of incorporating modifiers 200 (FIGS. 11-11A) within the resin-rich pockets 132 of woven fabric 126 (FIG. 6) may be applied to other woven or braided fiber forms, and is not limited to woven fabric 126. For example, modifier particulates 204 (FIG. 12A), modifier filaments 208 (FIG. 12A), and/or modifier coatings 210 (FIGS. 10-10A) may be applied to any type of braided fiber including, but not limited to, woven cloth, braided rope, and any other form of woven or braided fibers that may include resin-rich pockets 132.

FIGS. 9-9A respectively show a top view and a cross-sectional view of a fiber tow 118 comprised of a plurality of reinforcing filaments 120. In one example, the reinforcing filaments 120 may be formed of carbon. Alternatively, the reinforcing filaments 120 may be formed of other materials such as boron, ceramic, glass, and/or metallic material. Modifiers 200 may be applied to a composite layup 102 formed of the fiber tows 118 by spraying modifier particulates 204 onto the layup, as discussed above with regard to FIG. 8.

FIGS. 10-10A respectively show a top view and a cross-sectional view of a fiber tow 118 having a modifier solution or modifier coating 210 applied to one or more filaments on the outer edges 124 (e.g., side edges) of the fiber tow 118. A modifier coating 210 or solution may be applied to the opposing outer edges 124 of a fiber tow 118. The modifier coating 210 may also be applied to one or both outer edges 124 of unidirectional tape 122 (FIG. 4). The modifier coating 210 may be a thermoset monomer coating or a thermoset prepolymer coating. The thermoset prepolymer may be a toughened thermoset resin 114 (FIG. 8). Alternatively, the thermoset prepolymer may be a thermoset resin 114 containing modifier particulates 204 (FIG. 8) and/or modifier filaments 208 (FIG. 8). The thermoset prepolymer coating may have a modulus, a cure temperature, and/or a toughness that may be different than the resin modulus, the resin cure temperature, and/or the resin toughness.

For example, the coating modulus may be lower and/or coating toughness may be higher than the resin modulus/toughness which may reduce the susceptibility of the resin-rich pocket 132 (FIG. 7) to crack initiation or crack growth. The coating may have a lower cure temperature than the resin 114 cure temperature which may reduce or avoid the tendency for crack initiation at the interface between the relatively-high-CTE resin 114 (FIG. 7) and relatively-low-CTE reinforcing filaments. The thermoset monomer coating and/or thermoset prepolymer coating preferably has sufficient viscosity or surface tension to remain in the resin-rich pockets 132 during consolidation of the fiber 118 (FIG. 7) reinforced polymer matrix material. In this regard, the modifier coating 210 (10-10A) on the relatively-low-CTE reinforcing filaments is preferably high enough to resist displacement due to resin flow during consolidation.

In any one of the embodiments disclosed herein, a modifier coating 210 may be applied to bare fiber 118 or reinforcing filaments 120. Alternatively, a modifier coating 210 (FIGS. 10-10A) may be applied over a sizing that may be applied to the reinforcing filaments 120 during the manufacturing of the reinforcing filaments 120 (FIGS. 10-10A). Such sizing may include a surface finish that may be systematically deposited onto the surface of a reinforcing filament 120 in a generally uniform thickness to improve the adhesion between the reinforcing filaments 120 and the resin 114 (FIG. 7) and/or to protect the reinforcing filaments 120 from breakage such as during weaving and/or prepregging operations.

FIGS. 11-11A respectively show a top view and a cross-sectional view of a fiber tow 118 having modifier filaments 208 applied to or positioned along one or both of the opposing outer edges 124 of the fiber tow 118. In some examples, the modifier filaments 208 may be generally continuous filaments that may be oriented parallel to the reinforcing filaments 120 of a fiber tow 118. However, the modifier filaments 208 may be provided as chopped filament strands, and are not limited to continuous modifier filaments 208. The modifier filaments 208 may be included with or applied to the bundle of reinforcing filaments 120 that make up a fiber tow 118. In other examples, the modifier filaments 208 may be filament strands that may be tacked to the edges of the fiber tows 118. The modifier filaments 208 may be formed of carbon material or non-carbon material, and may have at least one modifier characteristic 202 that is different than the resin 114 (FIG. 7), as described above. For example, the modifier filaments 208 may have a modulus that is lower than the resin modulus, a modifier CTE that may be lower than the resin CTE, a modifier toughness that is higher than the resin toughness, a modifier density that is less than the resin density, a modifier distortional capability that may be higher than the resin distortional capability, and/or a modifier cure shrinkage that is lower than the resin cure shrinkage.

In any one of the embodiments disclosed herein, the modifier filaments 208 and/or modifier particulates 204 may be provided with a surface functionality (not shown). In some examples, the surface functionality may alter the characteristics of the bond between the resin 114 and the modifier filaments 208 (FIGS. 7-8). For example, the modifier characteristics 202 (FIG. 1) may include mechanical features that may be added to the outer surfaces of the modifier filaments 208 and/or modifier particulates 204 (FIGS. 7-8) to provide mechanical interlocking to the resin 114 (FIG. 7). The modifier filaments 208 and/or modifier particulates 204 may be provided with a coating (not shown) on the outer surface of the modifier filaments 208 and/or modifier particulates 204 to enhance adhesion to the resin 114, and/or to protect the modifier filaments 208 and/or modifier particulates 204 during processing such as during braiding or layup.

Figure 12:
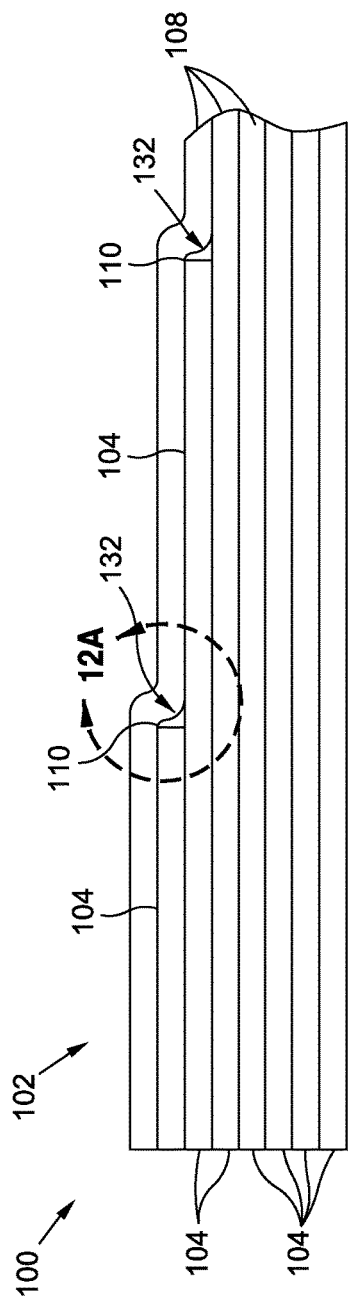
FIG. 12 is a cross-sectional view of a composite structure made up of a stack of laminated composite plies that periodically terminate to form a taper in the composite structure and generating ply steps that represent resin-rich pockets of the composite structure.

FIG. 12 is a cross-sectional view of a laminated composite structure 100 made up of a stack of laminated composite plies 104. The composite structure may have a tapered thickness. In the example shown, the composite structure may include two composite plies 104 that each terminate to form a ply step 110 in the composite structure 100. The termination of each ply step may represent the location of a resin-rich pocket 132.

Figure 12A:
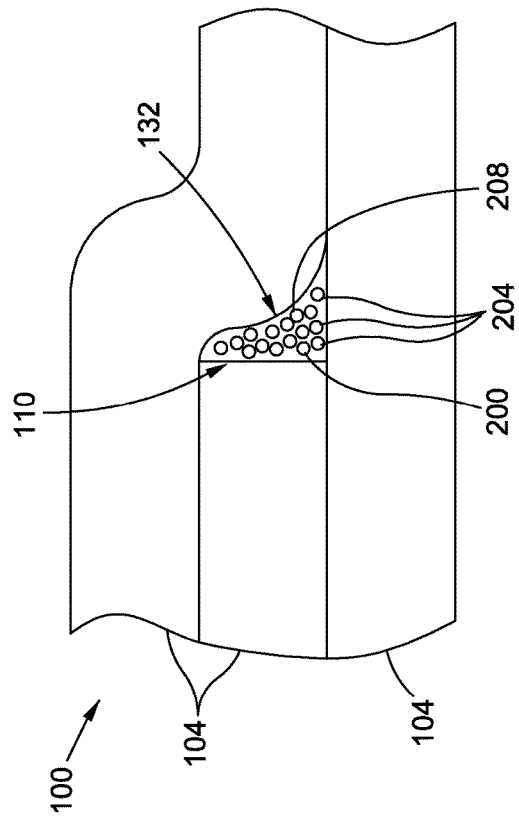
FIG. 12A is an enlarged sectional view of a composite structure ply step taken along line 12A of FIG. 12 and showing the placement of modifier particulates in the resin-rich pocket at the ply step.

FIG. 12A shows a cross-sectional view of one of the ply steps 110 of FIG. 12 and which may represent a location of a resin-rich pocket 132 in the composite structure 100. The resin rich pocket 132 may represent a location of stress concentrations in the composite laminate due to the ply termination. The resin-rich pocket 132 may include one or more modifiers 200. In this regard, modifiers may also be placed at locations immediately adjacent to an inside radius or outside radius (not shown) of curved (e.g., out-of-plane) composite plies. For example, modifiers 200 may be placed in resin-rich pockets 132 located adjacent to an outside radius of composite plies at an intersection of composite laminates such as at a radius filler (e.g., noodle) location (not shown) in a composite article.

In some examples, the modifiers 200 may be provided as modifier particulates 204 (FIGS. 7-8). The modifiers 200 in the resin-rich pocket 132 may have one or more of the above-described modifier characteristic 202 (FIG. 1) for mitigating or preventing crack initiation or crack growth within the resin-rich pocket 132. Modifier 200 configurations other than modifier particulates 204 may be placed within the resin-rich pockets 132 of ply steps 110. For example, any one of the above-described modifier 200 filament configurations may be placed in the resin-rich pockets 132 of a ply step 110. The modifier filaments 208 may be placed lengthwise along the ply step 110 (i.e., into the plane of the paper in FIG. 12). Modifiers 200 may be placed in the resin-rich pockets 132 of ply steps 110 during the layup of a composite laminate.

In one example, the modifiers 200 may contain polymer nanoparticles that provide at least one of increased toughness, increased flammability resistance, increased electrical conductivity, reduced cure-shrinkage-related distortion, reduced heat-of-reaction-related distortion, and reduced heat-of-reaction-related resin degradation. The polymer nanoparticles may be made from the same materials as the resin or at least one of thermoplastic material, acrylics, fluorocarbons, polyamides, polyolefins, polyesters, polycarbonates, polyurethanes, polyaryletherketones, polyetherimides, thermosetting material, polyurethanes, phenolics, polyimides, sulphonated polymer (polyphenylene sulphide), a conductive polymer (e.g., polyaniline), benzoxazines, bismaleimides, cyanate esthers, polyesters, epoxies, and silsesquioxanes. The polymer nanoparticles may also have at least one of the following properties: be at least partially soluble, have a core sheath configuration, have a higher, a nanoparticle cure shrinkage less than the resin cure shrinkage, a nanoparticle CTE different than the resin CTE, a nanoparticle heat of reaction less than the resin heat of reaction, a greater distortion capability than the resin, release either a catalyst or a hardener during a resin curing process, and/or the catalyst or hardener may alter a reaction rate of the resin.

Figure 13:
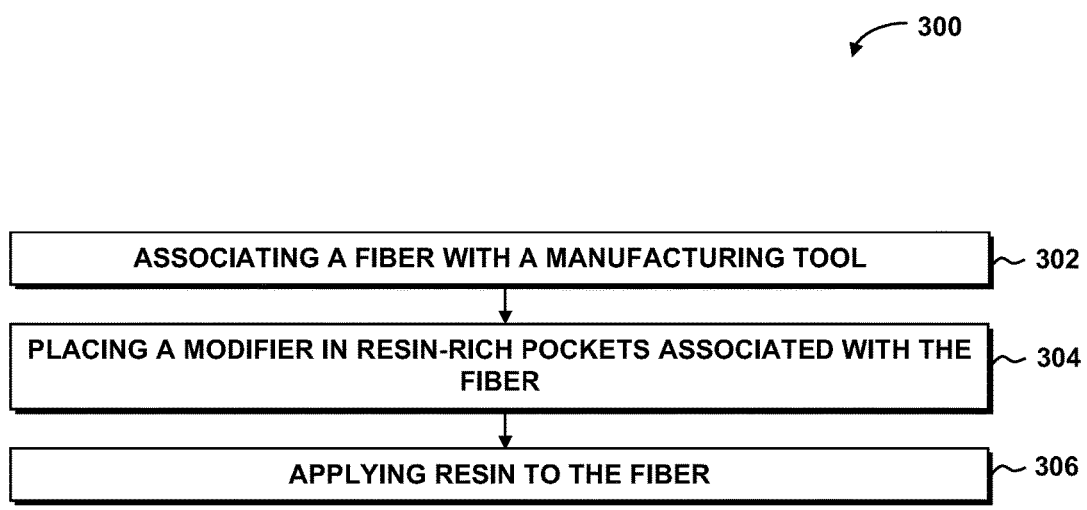
FIG. 13 is a flowchart illustrating one or more operations that may be included in a method of manufacturing a composite structure.

FIG. 13 is a flowchart showing one or more operations that may be included in a method 300 of manufacturing a composite structure 100. The method 300 may include placing modifiers 200 (FIG. 1) in resin-rich pockets 132 (FIG. 3) of a composite structure 100 for the purpose of mitigating or preventing crack initiation or crack growth as mentioned above. Step 302 of the method 300 may include associating a fiber 118 (FIG. 3) with a manufacturing tool. In some examples, the step of associating a fiber 118 with a manufacturing tool may include drawing a reinforcing filament 120 (FIG. 3) from a nozzle of a filament manufacturing device (not shown). In other examples, the step of associating a fiber 118 with a manufacturing tool may include braiding or weaving reinforcing filaments 120 and/or fiber tows 118 into a braided fiber form or woven fiber form such as a braided rope, woven fabric 126 (FIG. 6), woven cloth, or other braided or woven fiber forms. In still other examples, the step of associating a fiber 118 with a manufacturing tool may include applying fibers 118, fiber tows, or fiber preforms to a composite mold. For example, fiber tows 118 or roving, unidirectional tape 122, unidirectional sheet, woven fabric 126, and/or braided fiber preforms may be applied to a mold of any size, shape, or configuration, without limitation. The fiber tows 118 or roving, unidirectional tape 122 (FIG. 3), unidirectional sheet, woven fabric 126, and/or braided fiber preforms may be applied to the mold as dry fiber preforms or as prepreg.

Step 304 of the method 300 may include placing a modifier 200 in resin-rich pockets 132 associated with one or more fibers 118. For example, the step of including modifiers 200 in resin-rich pockets 132 may include selectively placing modifiers 200 in resin-rich pockets 132 such as during the process of laying up prepreg plies or dry fiber plies. In this regard, modifiers 200 may be provided or placed only in the resin-rich pockets 132 such that only the resin-rich pockets 132 consist of or include modifiers 200. Modifiers 200 may be provided in larger concentrations in the resin-rich pockets 132 as opposed to other resin areas of a composite layup 102. Alternatively, the method may include placing a modifier-resin mixture (not shown) in the resin rich pockets 132. For example, a pre-cured globule of a modifier-resin mixture may be selectively placed in each one of the resin rich pockets 132 of a layup after which base resin may be applied to the remainder of the layup.

In some examples, step 304 may include applying a modifier 200 (FIG. 1) to fibers 118 or reinforcing filaments 120 (FIG. 4) during manufacture or formation of the fibers 118 (FIG. 4) or reinforcing filaments 120, and wherein the reinforcing filament 120 may later define the boundaries or sides of a resin-rich pocket 132 (see e.g., FIG. 4) of a composite layup 102 (FIG. 2). In this regard, the modifier 200 may be applied prior to a layup of fibers 118 or reinforcing filaments 120. In one embodiment, the modifier coating 210 (FIG. 10) may be applied to a fiber 118 or reinforcing filament 120 while drawing the fiber 118 or reinforcing filament 120 from a fiber manufacturing device. In some examples, a modifier coating 210 may be applied to a reinforcing filament 120 after sizing is applied to the reinforcing filament 120, as mentioned above. In other examples, a solution containing modifier particulates 204 may be sprayed onto a fiber 118 or a reinforcing filament 120 during manufacturing of the fiber 118 or reinforcing filament 120. In still other examples, a modifier 200 such as a modifier coating 210 or modifier particulates 204 (FIG. 4) may be applied to a fiber tow 118 of bundled filaments 120 while drawing the fiber tow 118 from a spool (not shown) such as during a braiding or weaving operation. The modifier 200 may be applied by manual placement and/or by using a robotic device (not shown), or by other means.

The method may include applying a modifier coating 210 to the reinforcing filaments 120 of an outer edge 124 of a fiber tow 118, wherein the modifier coating 210 (FIG. 10) is a thermoset monomer coating or a thermoset prepolymer coating. The thermoset monomer coating and/or a prepolymer coating may be applied to the outer edges 124 (FIG. 10) of fiber tows 118, unidirectional tape 122 (FIG. 4), and/or woven fabric 126 during prepregging or during binder application. The modifier coatings 210 may be applied by spraying or rolling the modifier coating 210 onto the edges of the fiber tow 118 (FIG. 10). However, the modifier coating 210 may be applied in any one of a variety of different manners and is not limited to spraying or rolling. In some examples, a thermoset prepolymer coating may be applied to the outer edges 124 of fiber 118 prior to layup. As indicated above, the prepolymer may be a toughened thermoset resin or a thermoset resin containing modifier particulates 204 (FIG. 8) or chopped filament strands.

The step of placing a modifier 200 in resin-rich pockets 132 may also include applying one or more continuous modifier filaments 208 to one or both outer edge 124 of a fiber tow 118 having a bundle of continuous reinforcing filaments 120 as shown in FIGS. 3 and 11. The method may include orienting the modifier filaments 208 along a same general direction as the continuous reinforcing filaments 120 as shown in FIGS. 3 and 11. For example, the method may include applying one or more continuous modifier filaments 208 to one or both of the outer edges 124 of a fiber 118. In some examples, the modifier filaments 208 may be carbon filaments coated with a toughened resin or binder. In other examples, the modifier filaments 208 may be soluble filaments that dissolve in the resin 114 and toughen the resin 114 in the resin-rich pockets 132. Alternatively, the modifier filaments 208 may be chopped filament strands (not shown) that may be tacked to the outer edges 124 of the fiber tow 118.

The step of placing modifiers 200 in resin-rich pockets 132 may also include applying a modifier 200 to woven fabric 126 prior to layup of the woven fabric 126. For example, the method may include applying the modifier 200 (FIG. 7) during the manufacture of woven fabric 126 (FIG. 5) such as during the weaving of the woven fabric 126 and prior to layup. The modifier 200 may also be applied to a woven fabric 126 by placing the modifier 200 in divots 128 (FIG. 6) and/or gaps associated with a woven fabric 126 during prepregging operations and prior to layup, as mentioned above. The step of placing modifiers 200 in resin-rich pockets 132 (FIG. 7) may include applying the modifier 200 to a fiber preform 130 (FIG. 5) during layup of the fiber preform 130. For example, the method may include spraying modifier particulates 204 (FIG. 7) onto one or more plies of a composite layup 102 (FIG. 8). The method may additionally include selectively spraying or applying modifier particulates 204 in regions of a composite layup 102 that are anticipated to become resin-rich pockets 132 when resin is applied to the layup 102. For the case of a composite layup 102 formed of woven fabric 126 fiber preforms 130, the method may additionally include vibrating or moving the woven fabric 126 preforms during layup to facilitate agglomeration of the particulates 204 in the gaps and divots 128 of the woven fabric 126.

The step of placing modifiers 200 in resin-rich pockets 132 may also include printing by other manufacturing techniques including, but not limited to, hand application/printing, spray coating, fused deposition molding, lithography, stereolithography, flexography, dry transfer, laser sintering, selective heat sintering, plaster-based 3D printing, layer-by-layer deposition, inkjet printing, chemical/thermal binding and extrusion to position. Printed modifier 200 may include one or more of organic monomers, prepolymers, polymers, metallic powders, inorganic fillers, and an aqueous, solvent-based solution, fillers or secondary phases such as nano-silica, block copolymers, graphene platelets, carbon nanotubes, and other types of material. Advantageously, a printed pattern of modifier material may be provided in a hierarchical structure within the composite laminate to achieve specific functionality or performance improvements in a composite structure 100.

Step 306 of the method 300 may include applying resin 114 to the fiber 118 or reinforcing filaments 120. As indicated above, the fiber 118 (FIG. 8) or reinforcing filaments 120 (FIG. 8) may be part of a pre-impregnated fiber preform 130, in which case the step of applying resin 114 (FIG. 7) to the fiber 118 or reinforcing filaments 120 may be performed prior to or during the application of modifier 200 to the fiber 118 or reinforcing filaments 120. Alternatively, the fiber 118 or reinforcing filaments 120 may be part of a dry fiber preform 130 (FIG. 5) that may be later infused with resin 114 and allowed to cure to form a composite structure 100. Advantageously, the selective placement of modifiers 200 (FIG. 7) within the resin-rich pockets 132 (FIG. 8) of a composite structure 100 (FIG. 8) may reduce or prevent crack initiation and/or crack growth within the resin-rich pockets 132.

Figure 14:
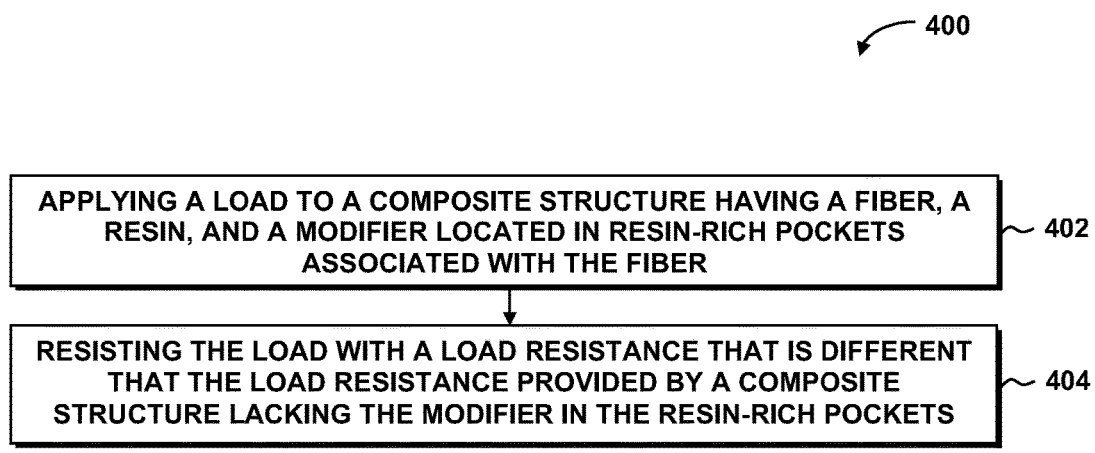
FIG. 14 is a flowchart illustrating one or more operations that may be included in a method of loading a composite structure.

FIG. 14 is a flowchart illustrating one or more operations that may be included in a method 400 of resisting microcracking within a composite structure 100. In some examples, the composite structure 100 (FIG. 1) may be a structural component of a vehicle such as an aircraft. In other examples, the composite structure 100 may be part of a stationary assembly such as a building or a non-vehicular structure.

Step 402 of the method 400 may include applying a load (e.g., a mechanical force or structural load) to a composite structure 100 having at least one fiber 118, a resin 114, and a modifier 200 located (FIG. 7) in resin-rich pockets 132 associated with the fiber 118. The load may be applied during the service life of the composite structure 100. Alternatively, the load may be a thermal load applied during manufacturing or thermal cycling of the composite structure 100. For example, the thermal load may be applied to the resin-rich pockets 132 during cool down of a composite structure 100 from an elevated temperature after curing. In addition, a thermal load may be applied to the composite structure 100 (FIG. 7) as a result of temperature variation during the service life of a composite structure 100 in its normal operating environment.

Step 404 of the method 400 may include altering the amount of energy required to form a microcrack in the modifier-containing resin-rich pockets relative to the energy required to form a microcrack in unmodified resin-rich pockets. The increase in energy required to initiate microcracks may be the result of an increase in the toughness of the resin-rich pockets 132 due to the addition of modifiers 200. The method may also include resisting a load on the composite structure 100 with a load resistance that is different that the load resistance provided by a composite structure 100 lacking the modifier 200 in the resin-rich pockets 132. For example, a tensile load may be applied to the composite structure 100 shown in FIGS. 2 and 4 and formed of a stack of unidirectional plies 108. As shown in FIG. 3, the composite structure 100 may include modifier filaments 208 placed along the outer edges 124 of the fiber tows 118 that make up each one of the composite plies 104. The fiber tows 118 may improve the toughness and or lower the resin CTE within the resin-rich pockets 132 of a composite structure 100 relative to the lower toughness and higher-CTE of resin-rich pockets that are devoid of such modifier filaments 208.

Advantageously, targeted placement of modifiers 200 within the resin-rich pockets 132 of a composite structure 100 may have the effect of increasing the toughness and/or reducing the resin CTE of resin 114 within the resin-rich pockets 132 (FIG. 3). An increase in the toughness and/or a reduction of the resin CTE within the resin-rich pockets 132 may reduce the difference in thermal expansion between the fibers 118 and the resin 114 in the resin-rich pockets 132 containing the modifier 200 (FIG. 10), relative to a greater difference in the thermal expansion of the fiber and the resin-rich pockets of a composite structure lacking modifiers 200 in the resin-rich pockets 132. A reduction in the difference in thermal expansion between the fibers 118 and the resin 114 (FIG. 4) in the resin-rich pockets 132 may result in a reduction in the total strain across the resin-rich pockets 132 during thermal cycling of the composite structure 100 relative to the total strain across resin-rich pockets 132 of a composite structure lacking the modifiers 200. As indicated above, the thermal cycling of a composite structure 100 (FIG. 3) may occur during processing or fabrication of a composite structure 100 such as during cool-down from an elevated cure temperature. Thermal cycling of a composite structure 100 may also occur due to changes in temperature of the operating environment of the composite structure 100. For example, in an aircraft, thermal cycling of a composite structure 100 of the aircraft may occur as a result of such as changes in air temperature with changes in altitude.

The reduction or prevention of microcracks within the resin-rich pockets 132 may translate into an increase in the load-carrying capability of the composite structure 100. In this regard, the load resistance capability of the composite structure 100 of FIGS. 2 and 4 may be greater than the load resistance capability of a composite structure lacking modifiers 200 in resin-rich pockets 132. The increase in the load-carrying capability of a composite structure 100 may translate into reduction in structural weight. In the case of an aircraft, a reduction in structural weight may improve the range, fuel efficiency, and/or payload capacity of the aircraft.

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite structure, comprising:
 a resin;
 a plurality of fibers at least partially embedded within the resin and provided in at least one of a flattened fiber tow of a unidirectional ply, a stack of composite plies, a tape, a woven fabric or cloth;

one or more resin-rich pockets associated with the fibers; and a modifier located in the one or more resin-rich pockets, the modifier being limited to the resin-rich pockets and excluded from non-resin-rich pockets of the composite structure, the modifier having at least one modifier characteristic that is different than a resin characteristic, the modifier being non-integral with the fibers;

wherein the resin-rich pockets are locations in the composite structure where the resin-rich pocket without the modifier would have a lower fiber-volume-fraction than the fiber-volume-fraction at other locations in the composite structure, the resin-rich pockets being limited to the following areas or any combination thereof:

limited to along one or more outer edges on laterally-opposing sides of a flattened fiber tow of the unidirectional ply or on laterally-opposing sides of the tape;

in divots at intersections of the fibers of the woven fabric or cloth; and at a ply step in the stack of composite plies.

2. The composite structure of claim 1, wherein the modifier has at least one of the following modifier characteristics:
a modifier elastic modulus that is lower than a resin elastic modulus of the resin;
a modifier coefficient of thermal expansion (CTE) that is lower than a resin CTE of the resin;
a modifier toughness that is higher than a resin toughness of the resin; and
a cross-sectional width of less than approximately 20 microns.

3. The composite structure of claim 1, wherein the modifier is at least one of:
a plurality of modifier particulates;
a solution or coating applied to outer edges of the fibers.

4. The composite structure of claim 3, wherein:
at least a portion of the modifier particulates are spherical.

5. The composite structure of claim 1, wherein:
the modifier is configured as one or more chopped modifier filaments.

6. The composite structure of claim 1, wherein:
the modifier is configured as one or more continuous modifier filaments.

7. The composite structure of claim 6, wherein:
the plurality of fibers have continuous reinforcing filaments; and
the continuous modifier filaments are positioned along at least one or more outer edges of one or more of the plurality of fibers and are oriented generally parallel to the continuous reinforcing filaments of the plurality of fibers.

8. The composite structure of claim 6, wherein the continuous modifier filaments are provided as at least one of the following:
thermoplastic filaments;
carbon filaments coated with a toughened resin or binder; and
soluble filaments that increase a toughness of the resin in the resin-rich pockets.

9. The composite structure of claim 1, wherein:
the modifier is a modifier coating comprising a thermoset monomer coating or a thermoset prepolymer coating; and
the modifier coating being applied to one or more reinforcing filaments on an outer edge of the fiber tow.

10. The composite structure of claim 1, wherein:
the modifier has the same chemical composition as the resin and is at least partially cured prior to final curing of the resin.

11. A method of manufacturing a composite structure comprising:
associating a plurality of fibers with a manufacturing tool;
including a modifier in resin-rich pockets associated with the fibers configured to be at least partially embedded within a resin and provided in at least one of a flattened fiber tow of a unidirectional ply, a stack of composite plies, a tape, a woven fabric or cloth;
the modifier being limited to the resin-rich pockets and excluded from non-resin-rich pockets, the modifier having at least one modifier characteristic that is different than a resin characteristic, the modifier being non-integral with the fibers;
wherein the resin-rich pockets are locations in the composite structure where the resin-rich pocket without the modifier would have a lower fiber-volume-fraction than the fiber-volume-fraction at other locations in the composite structure, the resin-rich pockets being limited to the following areas or any combination thereof:
limited to along one or more outer edges on laterally-opposing sides of a flattened fiber tow of the unidirectional ply or on laterally-opposing sides of the tape;
in divots and at intersections of the fibers of the woven fabric or cloth; and
at a ply step in the stack of composite plies.

12. The method of claim 11, wherein the step of including the modifier in resin-rich pockets comprises:
placing a modifier in the resin-rich pockets; and
applying resin to the fibers.

13. The method of claim 11, wherein the step of including the modifier in resin-rich pockets comprises:
placing a modifier-resin mixture in the resin-rich pockets; and
applying resin to a remainder of the fibers.

14. The method of claim 11, wherein the steps of associating the fibers with a manufacturing tool and including the modifier include:
applying the modifier to the laterally-opposing sides of the flattened fiber tow or to laterally-opposing sides of the tape while drawing the flattened fiber tow or tape from a fiber manufacturing device.

15. The method of claim 11, wherein the step of including the modifier in resin-rich pockets comprises:
applying one or more continuous modifier filaments to an outer edge of the flattened fiber tow having continuous reinforcing filaments; and
orienting the modifier filaments along a same general direction as the continuous reinforcing filaments.

16. The method of claim 11, wherein the step of including the modifier in resin-rich pockets comprises:
applying the modifier to the fibers during layup of the fibers.

17. The method of claim 11, wherein the step of including the modifier in resin-rich pockets comprises:
applying the modifier to a fiber preform during layup of the fiber preform.

18. The method of claim 11, wherein the step of applying the modifier to a fiber preform includes at least one of the following:
spraying modifier particulates onto one or more plies of a composite layup; and spraying/applying modifier particulates in regions that will become resin-rich pockets.

19. The method of claim 11, wherein the step of including the modifier in resin-rich pockets comprises:
applying a modifier coating to one or more reinforcing filaments of an outer edge of the fibers; and
the modifier coating comprising a thermoset monomer coating or a thermoset prepolymer coating.

20. The method of claim 19, wherein the step of applying the modifier to a fiber preform includes at least one of the following:
applying the modifier coating during formation of the flattened fiber tow, the tape, and/or the woven fabric or cloth; and
applying the modifier coating during prepregging of the flattened fiber tow, the tape, and/or the woven fabric or cloth.

21. A method of resisting microcracking within a composite structure, comprising the steps of:
applying a load to a composite structure having a resin, a plurality of fibers at least partially embedded within the resin and provided in at least one of a flattened fiber tow of a unidirectional ply, a stack of composite plies, a tape, a woven fabric or cloth, and a modifier located in resin-rich pockets associated with the fiber, the modifier being limited to the resin-rich pockets and excluded from non-resin-rich pockets of the composite structure, the modifier having at least one modifier characteristic that is different than a resin characteristic, the modifier being non-integral with the fibers;
wherein the resin-rich pockets are locations in the composite structure where the resin-rich pocket without the modifier would have a lower fiber-volume-fraction than the fiber-volume-fraction at other locations in the composite structure, the resin-rich pockets being limited to the following areas or any combination thereof:
limited to along one or more outer edges on laterally-opposing sides of a flattened fiber tow of the unidirectional ply or on laterally-opposing sides of the tape;
in divots and at intersections of the fibers of the fabric or cloth; and
at a ply step in the stack of composite plies; and
resisting the load with a load resistance that is different that the load resistance provided by a composite structure lacking the modifier in the resin-rich pockets.

22. The method of claim 21, further comprising:
reducing crack initiation or crack growth in the resin-rich pockets during thermal cycling of the composite structure relative to the crack initiation or crack growth occurring in resin-rich pockets of a composite structure lacking the modifier.

* * * * *